Jan. 7, 1969
G. C. HOUSWORTH
3,420,498
BUTTERFLY VALVE SEAT
Filed Jan. 31, 1967
Sheet 1 of 5
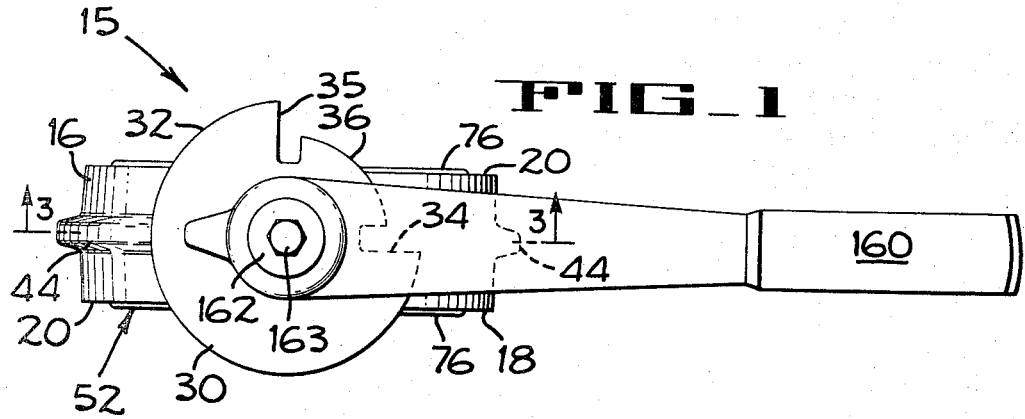
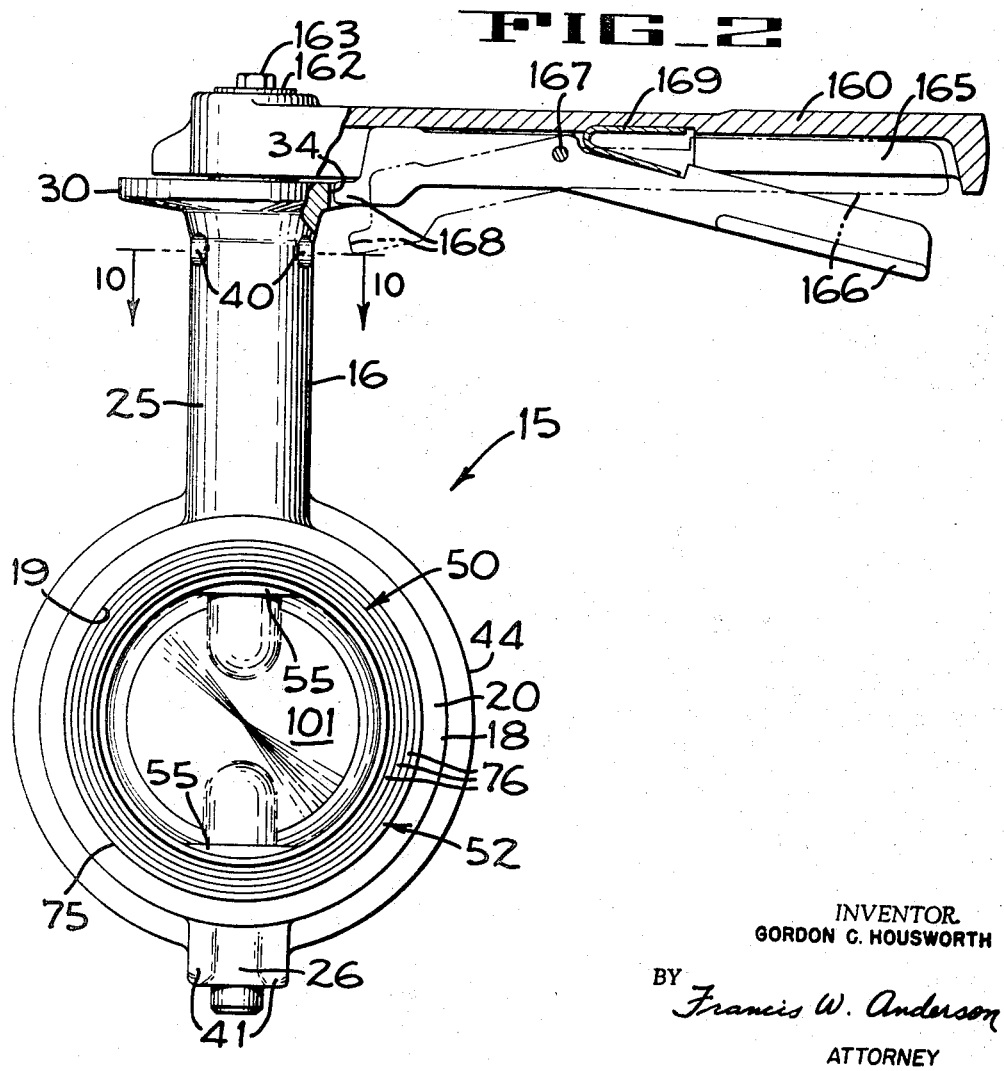
INVENTOR.
GORDON C. HOUSWORTH
BY Francis W. Anderson
ATTORNEY

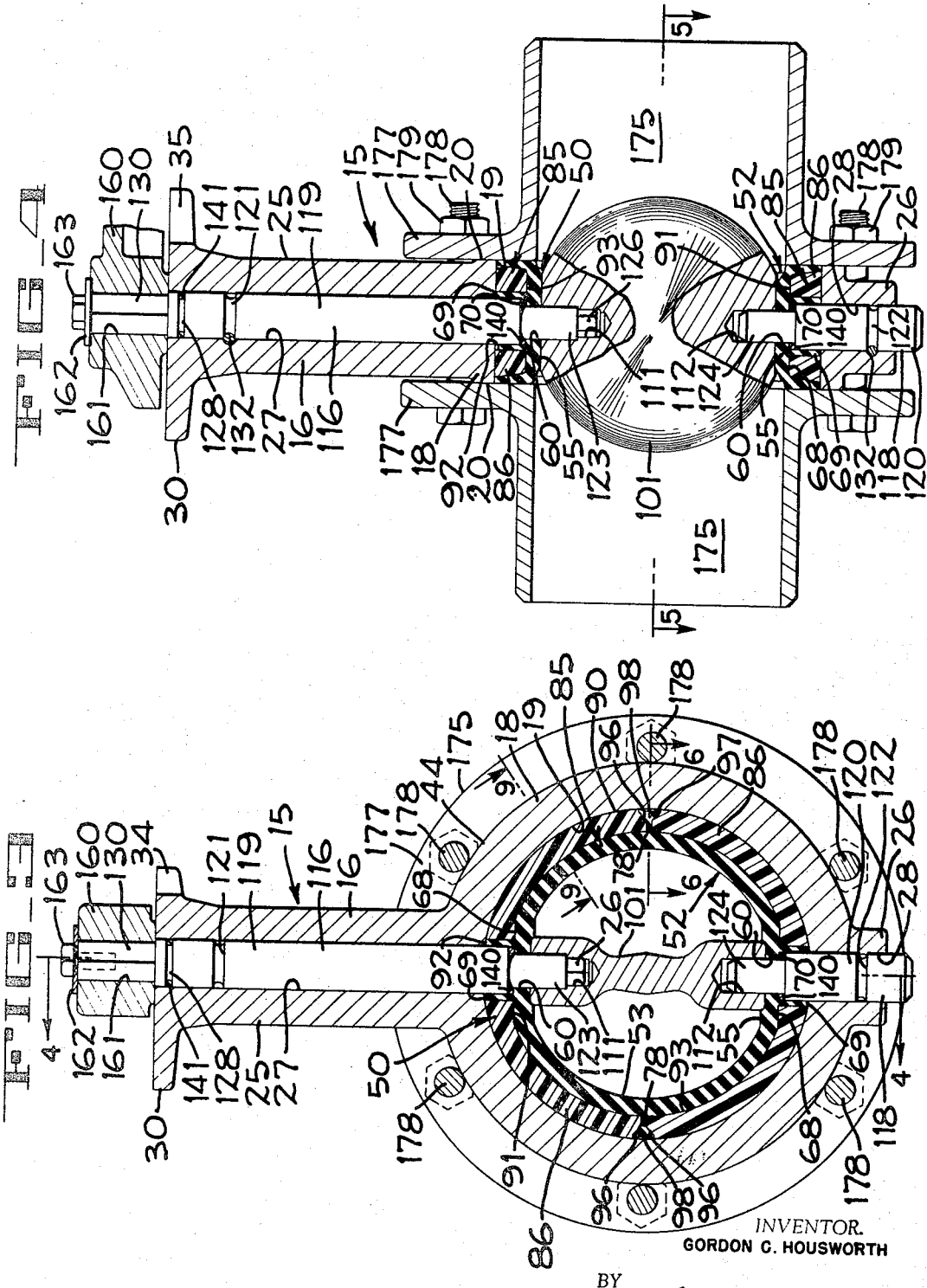

Jan. 7, 1969   G. C. HOUSWORTH   3,420,498
BUTTERFLY VALVE SEAT
Filed Jan. 31, 1967   Sheet 3 of 5
FIG_5
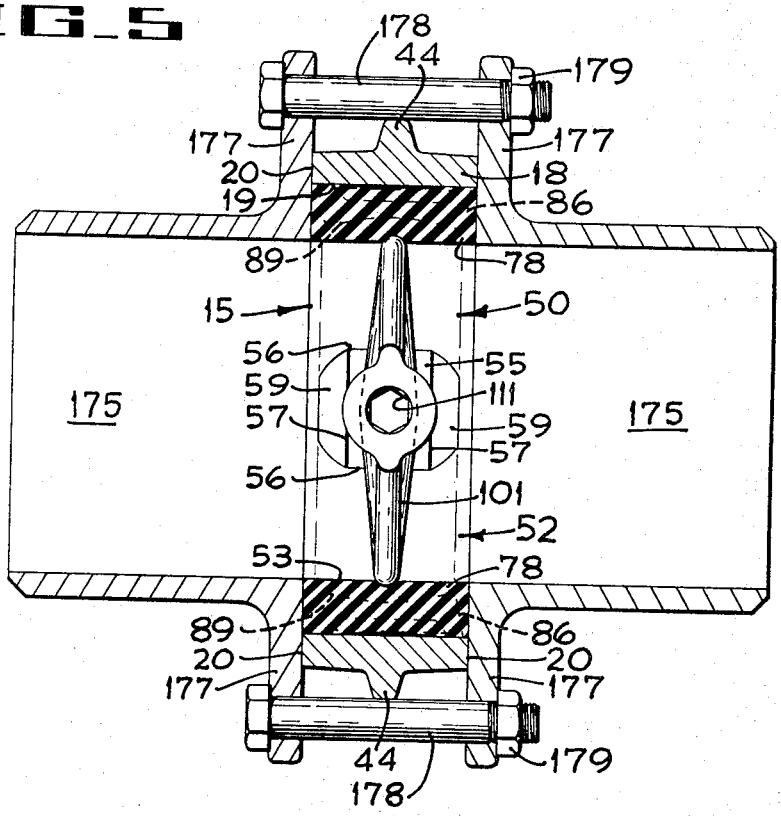
FIG_6
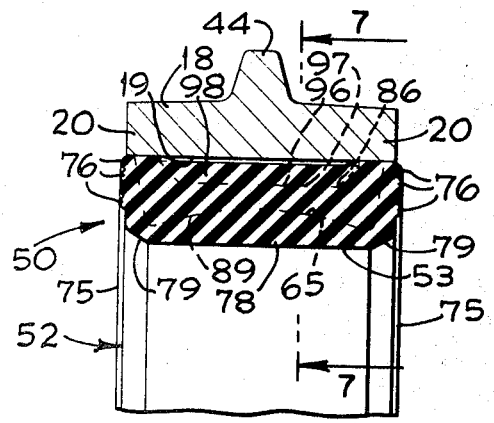
FIG_7
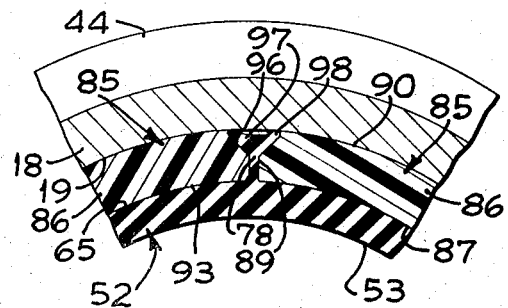
INVENTOR.
GORDON C. HOUSWORTH
BY Francis W. Anderson
ATTORNEY

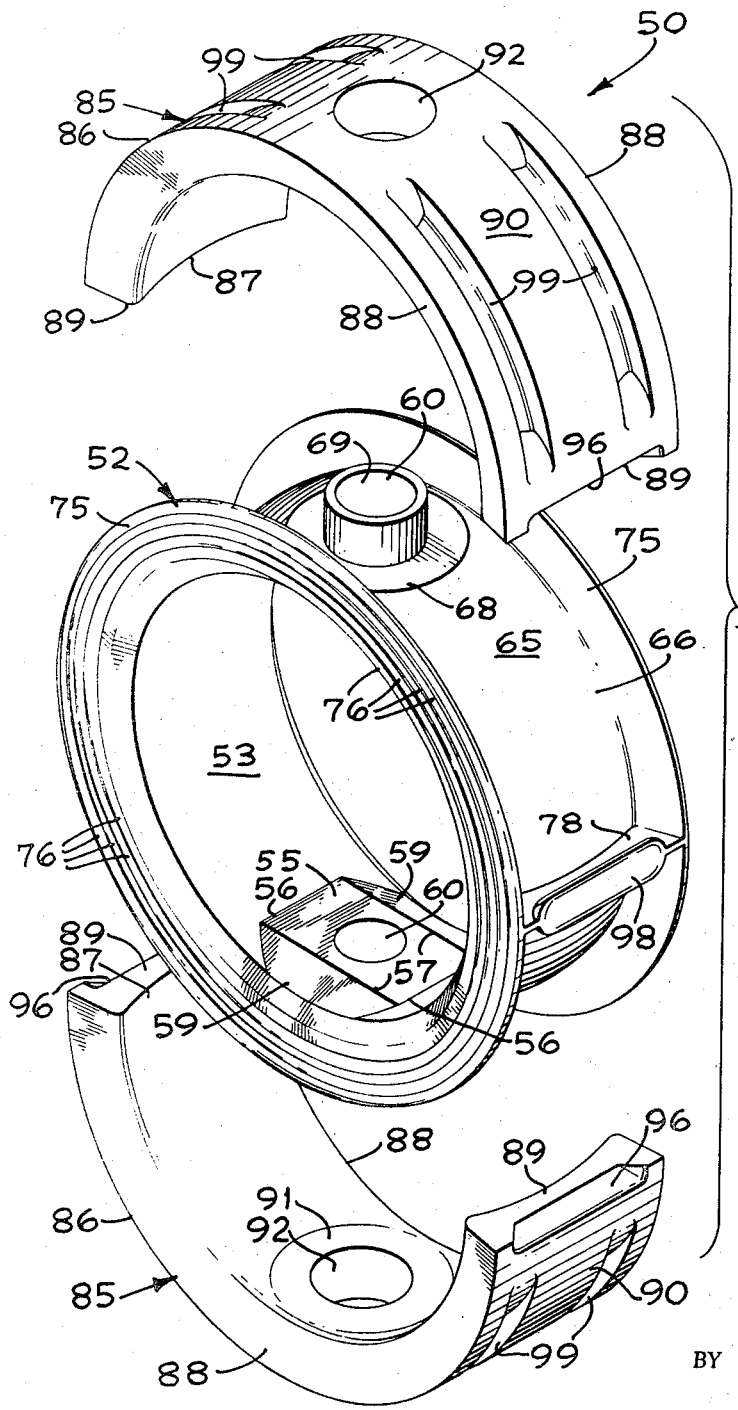

Jan. 7, 1969
G. C. HOUSWORTH
3,420,498
BUTTERFLY VALVE SEAT
Filed Jan. 31, 1967
Sheet 5 of 5
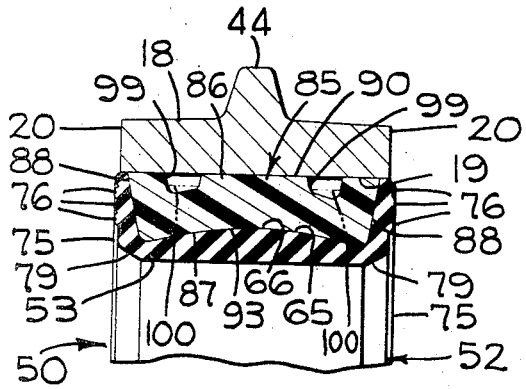
FIG_9
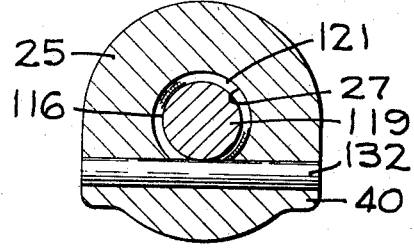
FIG_10
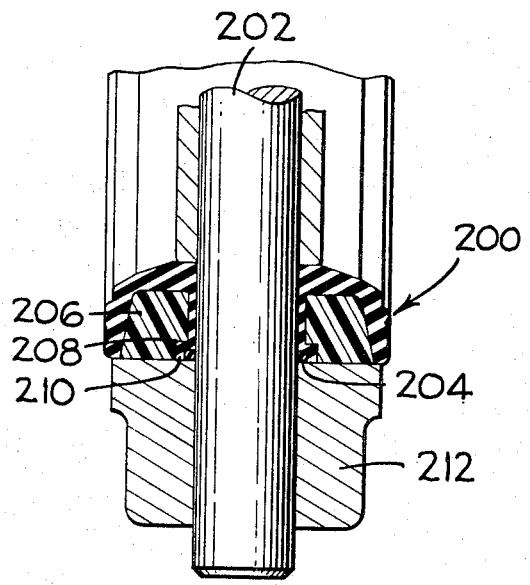
FIG_11
INVENTOR.
GORDON C. HOUSWORTH
BY Francis W. Anderson
ATTORNEY United States Patent Office 3,420,498
Patented Jan. 7, 1969

3,420,498
BUTTERFLY VALVE SEAT
Gordon C. Housworth, Houston, Tex., assignor to
FMC Corporation, San Jose, Calif., a corporation
of Delaware
Continuation-in-part of application Ser. No. 354,684,
Mar. 25, 1964. This application Jan. 31, 1967, Ser.
No. 612,892
U.S. Cl. 251—151                            27 Claims
Int. Cl. F16k 1/22; 1/32

ABSTRACT OF THE DISCLOSURE

A butterfly valve having a replaceable unitized seat assembly of resilient sealing material bonded to a firm arcuate backup, the assembly providing a substantially smooth and undistorted flow passage when the valve is installed in a flow line and the sealing material compressed to establish a fluid-tight seal.

*Cross reference to related application*

This application is a continuation-in-part of applicant's copending application Ser. No. 354,684, filed Mar. 25, 1964, now Patent No. 3,341,170, and entitled "Valve."

*Background of the invention*

The field of art to which the present invention pertains includes Class 137, subclasses 454.2 and 454.6, Class 251, subclasses 148, 305, 306, 307, 314, 316 and 317, and Class 277, subclasses 9 and 227 of the classification system of U.S. patents.

Butterfly valves of the prior art vary widely in design, but in general comprise an annular valve body, an annular seat within the body and in coaxial relation thereto, and a valve disc or buttefly pivotally mounted for rotation within the seat between a closed position with its circumferential edge in sealing engagement with the seat and an open position with portions of this edge spaced from the seat. Many of these seats are elastic, and those of earlier design are retained in the body by cement or by interfitting tongues and grooves or dovetails on the body and seat. These earlier seats are difficult to insert and remove, and to retain in proper position in the valve body especially when subjected to the relatively extreme conditions of modern service.

The more recently developed butterfly valves involve a replaceable seat unit of elastic or resilient material lining a rigid annular ring that is slidably fitted into the valve body. Although some of these valves perform acceptably under moderate pressures and flow rates, undesirable effects such as rippling and undulating of the seat, and creeping of the seat under and around the circumferential edge of the butterfly, occur when these valves are used in high velocity and/or high pressure flow service. These problems are aggravated by seats that have pronounced ridges or are otherwise excessively contoured on their flow-conducting surface, and in some instances severe turbulence can be created in the fluid passing through the valve.

Although each of these problems are solved by the valve seat assembly disclosed and claimed in applicant's aforementioned copending application, it has been found that if the inside diameter of the valve body is sufficiently undersized the seat assembly must be compressed radially inwardly to an abnormal degree in order to insert it into place, and the adjacent ends of the backups move closer together than normal and force the sealing material between them to migrate radially outwardly and inwardly, and axially to a degree. The radial outward migration causes the formation of an axial ridge that resists installation of the seat assembly, the inward migration forms an axial ridge in the inner or flow-conducting surface of the assembly that resists the opening and closing movement of the butterfly, thus requiring increased torque to operate it, and the axial migration produces bumps on the sealing faces of the seat that abut the line flanges, setting up a possible site for leakage. The inner ridges also are susceptive to increased wear which, of course, decreases the life of the seat.

It has further been discovered that if the connections between this valve and the flanged ends of the abutting flow lines are made up carelessly by over-tightening, the excessive pressure on the sealing material between the flanges and the opposing sealing faces of the backups likewise forces the sealing material radially inward toward the axis of the flow passage, creating annular ridges around both ends of the inner surface of the seat assembly at its juncture with the flanges. In some situations these annular ridges can materially affect the flow rate through the valve, create turbulence, and constitute a possible site for later valve failure.

Yet another factor leading to the present invention was discovered during the observance of many individuals as they were installing the valve of the aforementioned copending application. In an attempt at saving time, many merely dropped the valve between the flanges and made it up with them while while observing little or no alignment precautions. Although this procedure will often work, misalignment sometimes prevents the valve from providing sufficient flange sealing area to the flanges to establish the required seal. This problem prevails in all valves where this sealing area is restricted, and yet the properties, such as the internal modulus of shear, of the commonly used elastic sealing materials prevents the required extension of this sealing area without adequate support for this material, particularly where high pressures are involved.

*Summary of the invention*

The foregoing problems previously existent with butterfly valves are solved by the present invention which includes a replaceable-type, unitized seat assembly comprising a continuously annular seat of resiliently compressible sealing material and a generally annular backup of separate firm segments fitted about and bonded to the seat, the backup segments having adjacent opposing ends separated by a flange-like, radially outward extension of the seat, the ends having relieved areas at their outer edges, the sides of the segments that provide support for the flange sealing faces of the seat being tapered inwardly toward the axis of the seat's flow passage, and the annular edges of the seat at the juncture of the annular flow-conducting surface and the flange sealing faces being chamfered.

The relieved areas at the outer edges of the segment ends form a reservoir for sealing material that is forced radially outwardly from between the adjacent segment ends as a result of the movement of these ends toward each other when the seat assembly is constricted radially inwardly, thus preventing the formation of an outer axial ridge that would resist insertion of the assembly into the valve body, and also alleviating any tendency of this sealing material to migrate radially inwardly and form an axially extending ridge on the flow-conducting surface of the seat. The reservoir further serves to prevent the destruction of the flange-like extension of the saling material between the segment ends which could occur, were this reservoir absent, under excessive radially inward constricting pressure on the seat assembly that would force these flanges to migrate radially inwardly a distance greater than the internal modulus of shear of the seating material. To function ideally, the volume size of the reservoir must be more than the displaced sealing material so that none of this material is forced inwardly toward the flow passageway of the seat assembly.

The tapered sides of the backup segments provides the sealing material with a greater length for elongation due to compression as the face seals of the seat are compressed during the making up of the valve into the flow line. This increased facility for elongation makes it possible to greatly enlarge the pressure exerted on the face seals by the flow line flanges without exceeding the sealing material's internal modulus of shear, and thus the valve can be tightened further to the flanges to hold higher flow pressures. Though the primary use of these tapered sides is disclosed herein with a segmented backup, this feature has equal value when applied to a one piece or solid backup.

The chamfered seat edges aid in establishing a substantially straight, smooth flow-conducting surface on the seat between the line flanges to which the valve is made up, since the space created by this chamfering provides an area for accommodating the flange sealing material that is pressured radially inward toward the axis of the seat assembly.

Thus the seat assembly of the present invention solves the problems associated with internal and external axial ridges, annular ridges at the juncture of the seat and the line flanges, improper sealing between the seat and these flangs due to bumps or protrusions in the face seals of the assembly, and destruction of the sealing material and/or its bond to the backup due to migration exceeding the inner modulus of shear of the sealing material.

As will become evident from the following description, the seat assembly of this invention also over-comes the problem of improper sealing due to misalignment of the valve with the line flanges, for the assembly has a proportionately large annular sealing face at both ends of its flow passageway. These large sealing faces are supported by relatively wide and thick backup sides so that whatever tendency the sealing material may have to migrate axially away from its abutting flange is prevented. The result is a valve seat assembly that provides heretofore unprecedented latitude in misalignment between the valve and the line flanges while assuring a fully competent sealing action.

Accordingly an object of this invention is to provide improvements in a butterfly valve.

Another object is to provide a butterfly valve seat assembly that is easy to insert and remove.

Another object is to provide a butterfly valve seat assembly that does not creep or ripple incident to fluid pressure in the valve.

Another object is to provide a butterfly valve seat assembly which minimizes turbulence in the fluid flowing through the valve.

Another object is to provide a butterfly valve seat assembly with flange sealing faces of a magnitude in both size and strength to permit substantial misalignment between the valve and the line flanges to which it is connected without jeopardizing the integrity of the seal therebetween.

*Brief description of the drawings*

FIGURE 1 is a plan of a butterfly valve embodying the present invention and with the butterfly adjusting handle shown in a closed position.

FIGURE 2 is a side elevation of the valve of FIGURE 1 with the unlocked position of the handle shown in phantom.

FIGURE 3 is an enlarged transverse section taken on a plane indicated by line 3—3 in FIGURE 1 but with the handle and disc being shown in open postions and with the valve connected between a pair of flange fiittings.

FIGURE 4 is an axial section taken on a plane indicated by line 4—4 in FIGURE 3.

FIGURE 5 is an axial section taken on a plane indicated by line 5—5 in FIGURE 4 but with the butterfly in closed position.

FIGURE 6 is an enlarged fragmentary section taken on a plane indicated by line 6—6 in FIGURE 3 through the seating material flange between backup segments, and showing the seat assembly before it is compressed between the flange fittings.

FIGURE 7 is a vertical section taken on line 7—7 in FIGURE 6.

FIGURE 8 is an enlarged exploded isometric of the seat assembly embodying certain features of the present invention.

FIGURE 9 is an enlarged fragmentary section taken on a plane indicated by line 9—9 in FIGURE 3, showing the seat assembly before it is compressed between the flange fittings.

FIGURE 10 is an enlarged transverse section taken on line 10—10 in FIGURE 2.

FIGURE 11 is a transverse section, on an enlarged scale, through another form of seat assembly for use with a one-piece butterfly stem.

*Description of the preferred embodiments*

With particular reference to the drawings (FIGS. 1–5), a butterfly valve embodying the present invention is identified by the numeral 15 and includes a valve body 16 preferably of metal. The body has an annular shell 18 with an internal cylindrical wall 19 surrounding an axial bore through the body and having annular ends 20.

The valve body 16 (FIGS. 3 and 4) includes an upper neck 25 integral with the shell 18 and projecting upward therefrom and a lower neck 26 integral with the shell and projecting downward therefrom. The upper and lower necks have bores 27 and 28, respectively, therein which are in axial alignment with their common axis transverse to the axis of the axial bore within the wall 19. The upper neck includes a plate 30 radially projecting from the upper transverse bore 27. This plate has an outer arcuate edge 32 (FIG. 1) which extends throughout approximately 270°, lock-close and lock-open notches 34 and 35 at the ends of this edge, and an inner arcuate edge 36 between the notches.

The upper and lower necks 25 and 26 (FIG. 2) also have projecting pairs of tubular bosses 40 and 41 with the openings in each pair of bosses being in alignment and in communication with their respective upper and lower bores 27 and 28 (FIG. 4). In addition, the valve body 16 has a radial rib 44 (FIG. 1) projecting outward from the shell 18 intermediate the ends 20.

The unitized seat assembly 50 of the present invention is shown in FIGURES 3–9, but is best illustrated in detail in FIGURE 8 to which reference is now directed. The unitized seat assembly includes an annular seat 52 of resiliently compressible and flexible material such as rubber, this seat having an inner surface 53 which is cylindrical throughout substantially its entire circumference. However, the inner surface 53 includes diametrically opposed internal rectangular flats 55 having axial edges 56 and transverse edges 57. The inner surface also includes bevels 59 that extend from the transverse edges to the cylindrical portion of the inner surface. The axial edges of the flats intersect the cylindrical portion of the inner surface. The flats provide axially aligned openings 60 extending radially through the seat.

The seat 52 has an external circumferential surface 65 provided with an outwardly convex intermediate portion 66 which is best seen when viewed in a radial cross-section of the seat, as in FIGURE 9. The external surface includes external annular flats 68 individually encircling the openings 60. The seat also has collars 69 projecting outward from the external flats, and ledges 70 (FIGS. 3 and 4) are provided within the collars.

In addition, the seat 52 has end flanges 75 which project radially outward from the ends of the intermediate portion 66 and provide concentric sealing beads 76. Radial flanges 78 extend outward from the external surface 65 between the end flanges 75 and are in a common plane on diametrically opposite sides of the seat.

The intersection of the inner surface 53 and the end flanges 75 is chamfered at 79 to provide a relieved area for accommodating those portions of the end flanges that are forced radially inward when the assembly is compressed axially between two flanges. As illustrated best in FIGURE 5, the result is substantially a straight, smooth inner surface between the flanges with little if any tendency to create turbulence in the fluid flowing through the valve.

The unitized seat assembly 50 includes a split retainer or backup 85, preferably of plastic material in order to avoid corrosion. The backup includes a pair of substantially semi-cylindrical firm segments 86 having inner surfaces 87 complementarily fitted (FIG. 9) against the external surface 65 of the seat 52, annular side faces 88 in contact with the end flanges 75, and ends 89 in engagement with their respectively adjacent radial flanges 78. In other words, the radial flanges of the seat project outward between adjacent ends of the backup segments. The backup segments, when assembled, define a substantially cylindrical external surface 90 which, in the relaxed or unstressed condition of the annular seat, has a diameter greater than the diameter of the cylindrical wall 19 of the shell 18. Also, the side faces 88 of the assembled segments are spaced closer together than the ends 20 of the shell 18. The segments have inner flats 91 complementarily engaging the outer flats 68 and surrounding openings 92 which receive the collars 69, it being noted that the collars and end flanges 75 of the seat do not project farther out than the external surface 90 of the segments (FIG. 4). The backup segments are bonded, as at 93, to the seat throughout the entire interface therebetween so that the seat and segments are intimately united into a unitized seat assembly.

The ends 89 of the backup segments 86 are relieved at 96 to provide a reservoir-type space 97 for accommodating those portions of the seat flanges 78 that are forced radially outwardly when the assembly is constricted radially, as when it is inserted into the valve body and while it is in residence therein. Since the assembly is formed preferably by placing the previously formed backup segments 86 in a mold and injecting the sealing material around it until it fills the mold to form the seat 52 and unitize it with the segments, some of the sealing material can migrate slightly into this reservoir 97, as shown at 98 in FIGURE 8, but sufficient space in the reservoir should be maintained to more than, or at least sufficiently, accommodate that much of the flange 78 that migrates radially outwardly into it.

With reference to FIGURES 8 and 9 it will be noted that the external surface 90 of the backup segments 86 has a plurality of spaced, circumferentially extending grooves 99. These grooves are employed during molding of the seat assembly in order precisely to position each backup segment in the mold. Secondly, these grooves have another function in an alternative form of the valve. As indicated in dashed lines in FIGURE 9, tongues 100 can project from the cylindrical wall 19 into the grooves thereby restricting axial movement of the seat assembly within the shell 18. If this alternative form is employed, however, the shell is made in two semicylindrical halves which are bolted together.

In order to insert the seat assembly 50 into the valve body 16, the backup segments 86 are pressed toward each other thereby to compress the radial flanges 78 between the ends 89 and slightly to constrict the external surface 65 of the seat. With the seat assembly thus slightly diametrically constricted, the external diameter thereof (and specifically that of surface 90) is less than the diameter of the cylindrical wall 19 whereupon the seat assembly is axially slid into the axial bore, and the openings 60 are aligned with the transverse bores 27 and 28. In this position, the beaded end flanges 75 of the seat 52 project slightly beyond (FIG. 9) the opposite ends 20 of the shell 18. It is of considerable importance to note that when the seat assembly 50 is properly positioned in the shell 18, the seat 52, and particularly the radial flanges 78, is under compression, and the reactive radially outwardly directed force of the seat urges the retainer segments outward against the cylindrical wall 19.

The butterfly valve 15 also includes a valve disc or butterfly 101 (FIGS. 3, 4 and 5), and upper and lower valve stems 116 and 118 for rotatably mounting the disc 101 in the valve body 16. In this version, the stems have outer portions 119 and 120 axially slidably fitted in the transverse bores 27 and 28, and their respective outer portions having annular mounting grooves 121 and 122. These stems also have diametrically reduced inner portions 123 and 124, with the inner portion 124 of the lower stem being cylindrical and axially slidably projecting into the lower socket 112 and with the inner portion 123 of the upper stem having a hexagonal end 126 which is axially slidably received in the hexagonal socket 111 of the disc. Also, the upper stem has an upper annular sealing groove 128 and a square head 130 projecting above the plate 30 on the upper neck 25. Preferably, the stems are coated with Teflon, molybdenum disulphide or the like to provide resistance to corrosion and to facilitate rotation.

In order to retain the stems in their respective transverse bores, upper and lower pins 132 which can be solid, spiral, or roll pins, are mounted in the upper and lower pairs of bosses 40 and 41 and extend through the mounting grooves 121 and 122 of the stems (FIGS. 4 and 10); it is thus evident that these pins are substantially tangential to their respective stems so that they preclude axial, but allow rotational, movement of the stems in the transverse bores.

It is to be noted that the outer portions 119 and 120 of the stems 116 and 118 project slightly inward (FIG. 4) from the internal wall 19 into the collars 69 of the annular seat 52; the diameters of the outer portions and the collars are such that the collars are in slidably constricting fluid-tight engagement about the stems. Furthermore, the inner portions project through the openings 60 in the seat, and the diameters of the inner portions and the openings are such that the seat flats 55 are compressed about the inner portions of the stems in slidable fluid-tight engagement therewith. The disc 101 compresses the seat flats and thus the constriction of the seat about the inner portion of the stem is increased by the presence of the disc in the seat. Primary seals are thus established about the inner portions of the stems by the seat flats.

O-rings 140 surround the inner portions 123 and 124 of the stems 116 and 118 and bear against the ends of the outer portions 119 and 120, and thus are in fluid-tight engagement with both the inner and outer portions of the stems and with the surrounding collars 69, which in turn engage the outer portions 119 and 120 of the stem in a fluid-tight manner.

An upper seal is provided by an outer O-ring 141 in the groove 128 of the upper stem 116 and is in fluid-tight engagement with the upper neck 25, primarily to preclude entrance of external contamination into the valve.

The butterfly valve 15 also includes a handle 160 (FIGS. 1–4) having a square aperture 161 fitted over the square head 130 of the upper stem 116. A washer 162 is received over the projecting square head, and a cap screw 163 is threaded into a tapped hole in the head for retaining the handle on the stem.

The handle 160 has a lower cavity 165 (FIG. 2) extending lengthwise thereof, and a handle grip 166 is positioned within the cavity and mounted on a pin 167 for movement between locking and unlocked positions. The grip has a detent 168 projectable into one or the other of the notches 34 and 35 in the plate 30 when the detent is aligned with such notch and the handle grip is in its locking position. A V-shaped spring 169 is positioned in the cavity and bears against the grip for yieldably urging the same into its locked postion. Therefore, with the grip manually held in its unlocked position (phantom lines in FIG. 2), the handle can rotate the valve disc 101 between a fully open position (FIGS. 3 and 4) and a closed position (FIGS. 2 and 5). The disc can be positively held in either its closed or fully open positions by releasing the grip whereupon the detent projects into one of the notches 34 or 35 (full lines in FIG. 2).

The assembly of the valve 15 is briefly reviewed at this point. The inner O-rings 140 are positioned within the collars 69 against the ledges 70, and the seat assembly 50 is diametrically constricted and axially slid into the bore of the shell 18 so that the openings 60 are in alignment with the transverse bores 27 and 28. The valve disc 101 is inserted into the seat assembly until the sockets 111 and 112 align with the openings 60 in the seat 52. The lower stem 118 is inserted and is followed by the lower pin 132. The outer O-ring 141 is positioned in the groove 128 of the upper stem 116, and this upper stem is inserted into its described position and held there by insertion of the upper pin 132. Finally, the handle 160 is attached to the upper stem.

The valve normally is connected between a pair of flange fittings such as indicated diagrammatically by number 175 (FIGS. 3, 4 and 5). These can be ASA flanges or flanges of the slip-on type, or any other flanged-type fitting that will fit the valve. The flanges 175 are positioned against the opposite ends 20 of the shell 18, interconnected by bolts 178, and drawn up tightly with nuts 179. It is to be noted that with the flanges of the fittings clamping the valve therebetween, the beaded end flanges 75 are compressed into fluid-tight engagement with the flanges 177 so that leakage between the seat assembly and the flanges 177 is precluded.

In use of the subject valve 15, it is assumed that the flange fittings 175 are connected in a fluid line, not shown, so that fluid under pressure is conducted through them and the axial bore through the shell 18. It is an important advantage of the subject valve that fluid pressure within the valve is transmitted to the cylindrical wall 19 of the shell so that the shell is the actual pressure container. The reason why this fluid pressure is transmitted to the shell is the diametrically elastic characteristic of the seat assembly 50. As above explained, the seat assembly is held under compression within the shell so that normally, the backup segments 86 are resiliently pressed against the wall 19 by the seat 52; internal fluid pressure merely increases this outward pressure against the shell. Thus, the valve is stronger and more durable since the shell is better able to contain these pressures than is the seat assembly.

At the same time, however, the backup holds the seat 52 within the wall 19, maintains the desired generally cylindrical shape of the seat and precludes collapsing thereof, and facilitates insertion and removal of the seat. Furthermore, because of the rigidity of the backup segments 86 and the unitized attachment thereof to the seat, the latter is prevented from ballooning in any portion thereof under fluid pressure.

An alternate unitized seat assembly 200 is illustrated in FIGURE 11. This assembly is designed for use with a one piece stem 202, and has all of the features and advantages of the assembly 50. Where the diameter of the stem 202 is constant as shown in FIGURE 11, the O-ring 204 is relocated radially outward but still within the annular confines of the assembly 200. The backup segment 206 is relieved at 208 to provide a housing for the O-ring 204 and, if desired, for some seating material 210 that will provide a compressive force against the O-ring 208 to make it seal more tightly between the stem 202, the sealing material 210, and the valve body 212.

Both seat assemblies 50 and 200 have further advantages. The maximum radial dimension of the intermediate convex portion of the seat maintains a desirable amount of seat material around and on opposite sides of the disc when the latter is in closed position so as to minimize creeping of the seat and resultant leakage under high fluid pressure. This maximum intermediate radial thickness is achieved without disturbing the essentially cylindrical internal surface of the seat, it being understood that a cylindrical internal surface is desirable in order to establish full circle seating of the disc, to facilitate opening and closing of the disc and to minimize turbulence in the fluid being conducted. Undulating or rippling of the seat is minimized since the opposite end portions of the seat are of reduced radial thickness. In addition, turbulence control is achieved by utilizing the bevels which smooth out the flow passage around the seat flats.

The taper or angle of the backup segments should be such that the resultant displaced sealing material from the end sealing faces fills in the reservoir-type area provided by the chamfers so that a straight or flush inner surface in the flow passageway of the seat assembly is achieved. The thickness of the backup segments also is not critical, so long as it is sufficient to prevent deformation of the segments under all conditions that will be encountered during service. The thickness of the segments along their tapered sides at the ends where they define the reservoir should be sufficient to prevent the sealing material of the faces from migrating towards the reservoir instead of radially towards the axis of the assembly.

The reservoir shape is not critical other than if the sides are sloped the angle of the slope should be between about 45° and 90° to provide the best results. If the reservoir sides are not sloped, i.e., are at about right angles to the surface, the edges of the reservoir preferably are rounded.

It will be evident from the foregoing that the subject valve is provided with a seat assembly which is easy to insert and remove, a special advantage when it is desired to replace the seat assembly in the field; which is stronger and more durable since internal fluid pressures are contained by the valve body instead of the seat assembly; which improves the seal between the disc and the seat and around the valve stem; and which minimizes turbulence in fluid flowing through the valve. It will be readily appreciated that the valve is ideal for handling dry materials and slurry as well as liquids and gases.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. In a valve including a valve body having a circumferential internal wall surrounding a flow passage through the body, a unitized seat assembly comprising a continuously annular seat of resiliently compressible material positioned within the wall and a generally annular retainer of separate firm arcuate segments fitted about and bonded to the seat, said body diametrically constricting said retainer and compressing said seat and said retainer being urged by the seat into friction-tight engagement with the wall, said segments having ends in closely adjacent and opposing relationship, said ends being relieved along their external edges to form a reservoir between said opposing ends for accommodating displaced seat material, a valve disc mounted for rotatable movement within the seat, and means for rotatably moving the disc.

2. The valve of claim 1 wherein there are two retainer segments, each such segment extending over slightly less than 180° of the circumference of the seat.

3. The valve of claim 1 wherein said seat is rubber, said retaining segments are of rigid hard plastic, and wherein said segments are bonded to said seat.

4. The valve of claim 1 wherein the valve disc is mounted on a two-piece stem.

5. The valve of claim 1 wherein the valve disc is mounted on a single stem extending through the seat assembly.

6. In a valve including a valve body having a circumferential internal wall surrounding a flow passage through the body, a unitized seat assembly comprising a continuously annular seat of resiliently compressible material positioned within the wall and a generally annular retainer of separate firm arcuate segments fitted about and bonded to the seat, said body diametrically constricting said retainer and compressing said seat and said retainer being urged by the seat into friction-tight engagement with the wall, said segments having lateral sides that taper inwardly from the outer surface of said segments towards the axis of said assembly, a valve disc mounted for rotatable movement within the seat, and means for rotatably moving the disc.

7. The valve of claim 6 wherein there are two retainer segments, each such segment extending over slightly less than 180° of the circumference of the seat.

8. The valve of claim 6 wherein said seat is rubber, said retaining segments are of rigid hard plastic, and wherein said segments are bonded to said seat.

9. The valve of claim 6 wherein the annular seat has a substantially annular flow surface and outwardly diverging end sealing flanges, said end sealing flanges having a plurality of concentric annular ribbed protrusions, said flow surface intersecting said sealing flanges along a pair of annular outwardly diverging surfaces appearing as chamfered edges of said flow surface.

10. The valve of claim 6 wherein the valve disc is mounted on a two-piece stem.

11. The valve of claim 6 wherein the valve disc is mounted on a single stem extending through the seat assembly.

12. In a valve including a valve body having a circumferential internal wall surrounding a flow passage through the body, a unitized seat assembly comprising a continuously annular seat of resiliently compressible material positioned within the wall and a generally annular retainer of separate firm arcuate segments fitted about and bonded to the seat, said body diametrically constricting said retainer and compressing said seat and said retainer being urged by the seat into friction-tight engagement with the wall, said segments having ends in closely adjacent and opposing relationship, said ends being relieved along their external edges to form a reservoir between said opposing ends for accommodating displaced seat material, said segments also having sides extending between said ends and converging inwardly toward the axis of said flow passage, a valve disc mounted for rotatable movement within the seat, and means for rotatably moving the disc.

13. The valve of claim 12 wherein there are two retainer segments, each such segment extending over slightly less than 180° of the circumference of the seat.

14. The valve of claim 12 wherein said seat is rubber, said retaining segments are of rigid hard plastic, and wherein said segments are bonded to said seat.

15. The valve of claim 12 wherein the annular seat has a substantially annular flow surface and outwardly diverging end sealing flanges, said end sealing flanges having a plurality of concentric annular ribbed protrusions, said flow surface intersecting said sealing flanges along a pair of annular outwardly diverging surfaces appearing as chamfered edges of said flow surface.

16. The valve of claim 12 wherein the valve disc is mounted on a two-piece stem.

17. The valve of claim 12 wherein the valve disc is mounted on a single stem extending through the seat assembly.

18. In a valve including an annular valve body, a unitized seat assembly fitted within the body and including an annular resiliently compressible seat and annular retainer means of firm material fitted about substantially the entire cirucmference of said seat, said retainer means having a plurality of firm arcuate segments, said segments having ends in closely adjacent and opposing relationship, said ends being relieved along their external edges to form a reservoir between said opposing ends for accommodating displaced seat material, said segments also having inwardly converging sides, said annular seat having a substantially annular flow surface and outwardly diverging end sealing flanges, said end sealing flanges having a plurality of concentric annular ribbed protrusions, said flow surface intersecting said sealing flanges along a pair of annular outwardly diverging surfaces appearing as chamfered edges of said flow surface, the said seat being of rubber, said retaining segments being of rigid hard plastic, and said segments being unitized with said seat.

19. The valve of claim 18 wherein there are two retainer segments, each such segment extending over slightly less than 180° of the circumference of the seat.

20. The valve of claim 18 wherein the valve disc is mounted on a two-piece stem.

21. The valve of claim 18 wherein the valve disc is mounted on a single stem extending through the seat assembly.

22. A unitized seat assembly for a butterfly valve, comprising a continuous generally annular seat of resiliently compressible material having a tubular body with an inner surface defining a flow passage and an outer surface spaced radially outward from said inner surface, and annular end sealing flanges extending radially outward from said body, said sealing flanges having opposed outwardly diverging inside surfaces intersecting said body outer surface and the intersections of said outside surface of said sealing flanges with said body inner surface being chamfered to provide a relieved area for accommodating displaced seat material, said body inner and outer surfaces each having a pair of diametrically opposed flat portions with said outer surface flat portions being positioned radially outward from and substantially parallel to said inner surface flat portions to define flat areas in said seat of generally uniform thickness; and generally annular firm seat retainer means bonded to the outer surface of the seat, said retainer means having inwardly converging sides confronting said outwardly diverging side surfaces of said end sealing flanges to provide support for said flanges, such that when said assembly is compressed axially between generally parallel surfaces said converging sides cooperate with said flanges to provide seals of uniform compression between said assembly and said generally parallel surfaces, and said chamfered intersections cooperate with said flanges to provide a substantially undistorted flow passage.

23. The unitized seat assembly of claim 22 wherein said retainer means has a pair of diametrically opposed flat portions complementarily engaging said outer surface flat portions of said seat.

24. The unitized seat assembly of claim 22 wherein said outside surfaces of said sealing flanges are beaded.

25. The unitized seat assembly of claim 22 wherein said retainer means comprises a plurality of separate rigid arcuate segments fitted about and bonded to the outer surface of said tubular body, said segments having opposing ends with the adjacent ends of adjacent segments being in spaced relation to each other, said segments being thereby in cylinder-forming relation and being radially movable to increase or decrease the diameter of the cylinder formed thereby.

26. The unitized seat assembly of claim 25 wherein said seat has flanges projecting radially between said adjacent segments.

27. The unitized seat assembly of claim 25 wherein said opposing ends of said segments are relieved along their external edges to form reservoirs between said ends for accommodating displaced seat material.

References Cited

UNITED STATES PATENTS

| | | | |
|---|---|---|---|
| 3,042,362 | 7/1962 | Kinney | 251—306 |
| 3,048,363 | 8/1962 | Garrigan | 251—307 |
| 3,118,465 | 1/1964 | Scaramucci | 251—308 X |
| 3,233,861 | 2/1966 | Stillwagon | 251—306 X |
| 3,338,551 | 8/1967 | Black | 251—306 |

M. CARY NELSON, *Primary Examiner.*

R. C. MILLER, *Assistant Examiner.*

U.S. Cl. X.R.

251—306